No. 628,761. Patented July 11, 1899.
R. J. CHENOWETH.
HARROW.
(Application filed Jan. 26, 1899.)
(No Model.)
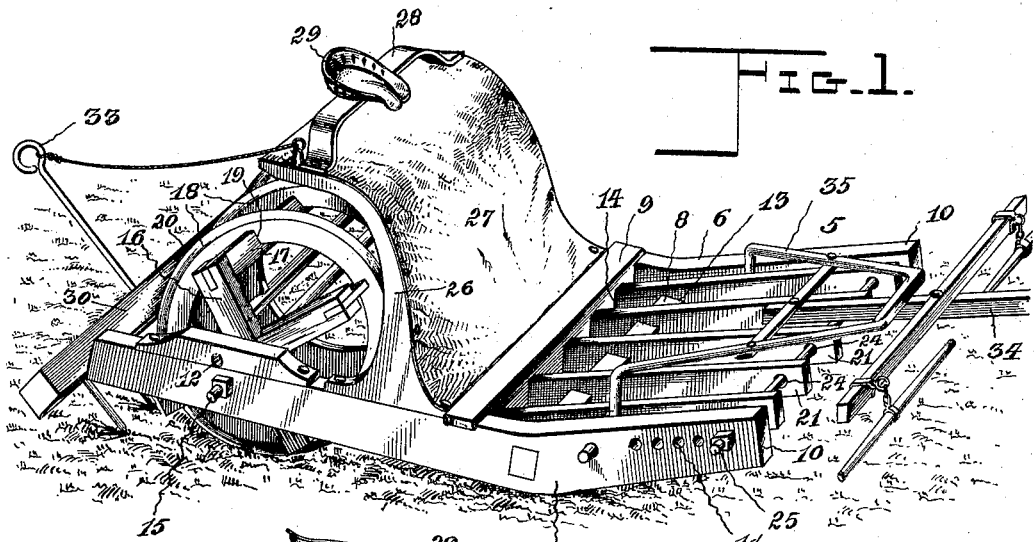
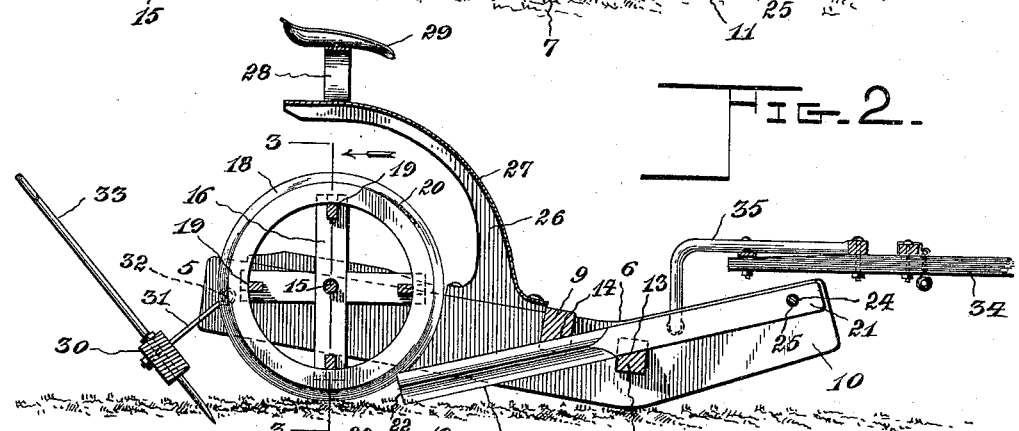
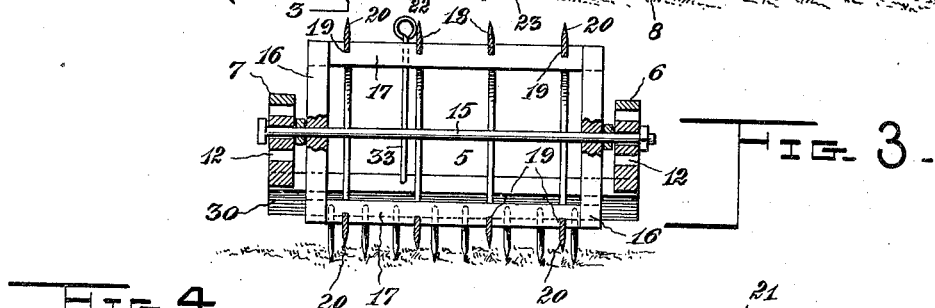
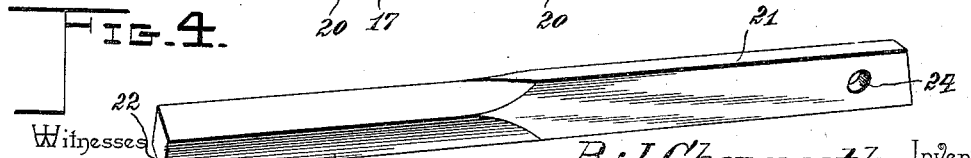
Witnesses  R. J. Chenoweth Inventor
By his Attorneys,

UNITED STATES PATENT OFFICE.

ROBERT JAMES CHENOWETH, OF MINNORA, WEST VIRGINIA.

HARROW.

SPECIFICATION forming part of Letters Patent No. 628,761, dated July 11, 1899.

Application filed January 26, 1899. Serial No. 703,502. (No model.)

*To all whom it may concern:*

Be it known that I, ROBERT JAMES CHENOWETH, a citizen of the United States, residing at Minnora, in the county of Calhoun and State of West Virginia, have invented a new and useful Harrow, of which the following is a specification.

My invention relates to improvements in harrows of that class which employ revoluble disks; and the prime object in view is to provide an improved structure which embraces knife-bars in connection with revoluble disks or rings and with the elements arranged to attain efficiency in pulverizing the ground and crushing the clods.

A further object of the invention is to provide means for adjusting the revoluble disks or ring cutters and the knife-bars in order to compensate for wear of the earth-pulverizing elements and to bring the same into condition for service to secure thorough reduction of the ground to a pulverized condition.

A further object of the invention is to provide a simple structure adapted to support a driver's seat and to be drawn by a team with the same degree of efficiency as an ordinary harrow, and with the harrow is combined a rake device adapted to be used in covering seed, but which may be raised out of operative position by the driver at any time for the purpose of freeing the rake from accumulations of weeds or trash.

With these ends in view my invention consists in the novel combination of elements and in the construction and arrangement of parts, which will be hereinafter fully described and claimed.

To enable others to understand my invention, I have illustrated the preferred embodiment thereof in the accompanying drawings, forming a part of this specification, and in which—

Figure 1 is a perspective view of a harrow constructed in accordance with my invention. Fig. 2 is a longitudinal sectional elevation taken centrally through the harrow. Fig. 3 is a vertical transverse section on a plane through the revoluble cylinder and indicated by the dotted line 3 3 of Fig. 2. Fig. 4 is a perspective view of one of the drag cutter-bars.

Like numerals of reference denote like and corresponding parts in each of the several figures of the drawings.

The main frame of my improved harrow consists of the runners 6 7 and the cross-rails 8 9, said rails being joined firmly to the runners at points intermediate of the length thereof. The runners for major portions of their length lie in horizontal planes; but the front ends of the runners are inclined upwardly and forwardly, as at 10. The inclined front ends of the runners are formed with series of transverse openings 11, and these openings of the two runners are arranged coincident with each other to accommodate an adjusting bar or rod for the drag cutter-bars, as will hereinafter appear. The runners are arranged parallel to each other and at a proper distance apart to accommodate between them a series of drag-bars and a revoluble drum or cylinder, and the cross-rails 8 9 serve to unite or couple the runners together and as the support for the drag-bars. The runners are furthermore provided near their rear ends with the series of openings 12, the openings of each series being arranged one above the other in the same vertical plane, and these perforated parts of the runners support the shaft of a revoluble cylinder or drum.

The cross-rail 8 is joined to the runners at the points where the inclined front ends 10 branch therefrom, and said cross-rail is provided in its upper edge with a series of notches 13, which open through said upper edge of the rail. The other cross-rail 9 lies a short distance in rear of the cross-rail 8 and parallel therewith; but the rail 9 is united to the runners at a point above the union of the rail 8 therewith. This cross-rail 9 has a series of notches 14 formed in the lower edge thereof, and the notches of the two rails are in the same planes longitudinally of the harrow for the purpose of fitting the drag-bars in the notches of the two cross-rails.

15 designates the drum-shaft, which is arranged across the main frame 5 near the rear ends of the runners, and the ends of this shaft are fitted in coincident openings 12, which lie in the same horizontal plane. The revoluble cylinder or drum is mounted loosely on this transverse shaft 15 to rotate freely thereon, and said drum is situated between the parallel runners and near the rear end of the main frame 5. The drum or cylinder consists of the heads or spiders 16, the longitudinal bars 17, and the ring cutters or disks 18. The longitudinal bars 17 are united firmly to the heads or spiders 16 to form therewith a skeleton frame, and the ring cutters or disks 18 are fastened to the bars 17 at suitable intervals one from the other. As shown by Fig. 2, each ring cutter is provided at its inner edge with radial notches 19, that are spaced apart corresponding to the bars 17, and said bars are fitted snugly in the notched edges of the rings. The construction may, however, be reversed by providing the notches in the bars 17 and fitting the edges of the ring cutters therein, as shown by the drawings. Each ring cutter is constructed, preferably, of metal and of any suitable size; but I prefer to bevel the outer edge of each cutter in order to form or produce thereon a circumferential cutting edge 20. By constructing the longitudinal bars 17 with notches and fitting the ring cutters in said notches the cutters are held on the skeleton frame of the cylinder or drum against movement lengthwise thereof, and the described construction also insures proper spacing of the ring cutters and their retention in parallel relation one to the other. The heads or spiders of the revoluble cylinder or drum are provided with central openings to receive the drum-shaft 15, and this shaft is easily removable from the openings 12 in the main frame 5 and from the heads of the cylinder, whereby the shaft may be adjusted in another pair of openings 12 for the purpose of raising or lowering the revoluble cylinder within the frame. This adjustment of the revoluble cylinder in a vertical direction within the frame is advantageous, because it enables the position of the drum to be changed in order to compensate for wear on the ring cutters of the cylinder. While I have shown and described the frame as having the vertical series of openings for the adjustment of the drum-shaft, I do not strictly confine myself to the particular means for securing such vertical adjustment, because I am aware that slidable bearings or other mechanical devices may be employed in connection with the drum-shaft to lower the latter as required.

In connection with the revoluble cutter head or cylinder I employ a series of drag-bars 21, which are arranged in a general longitudinal direction between the runners of the main frame 5. These drag-bars are made of metal in any suitable proportion, and for a part of its length each drag-bar is provided on its lower edge with the reversely-beveled faces 22, that converge to produce the cutting edge 23, which extends for a part of the length of the drag-bar. The front end of each drag-bar is provided with a transverse opening 24, and the lower edge of the drag-bar in advance of the cutting edge 23 is at right angles to the faces of the drag-bar in order that the latter may fit snugly in the notches 13 of the cross-rail 8. The series of drag-bars have their lower edges fitted in the notches of the cross-rail 8, while their upper edges are received in the notches 14 of the cross-rail 9. As the two cross-rails are arranged in different horizontal planes and as the drag-bars are fitted in notches formed in the reverse faces of the cross-rails, said drag-bars are caused to assume inclined positions longitudinally of the frame, so as to lie substantially parallel to the inclined front ends 10 of the runners, and said drag-bars are held firmly in place by the cross-rails 8 9 and by an adjusting-bar 25. This adjusting bar or rod 25 is passed through the openings 24 at the front ends of the series of drag-bars, and the ends of the adjusting-rod are received in coincident openings 11 of the runners. The drag-bars are free to be adjusted by a slidable movement through the notches in the cross-rails, and the rod 25 may be withdrawn from one pair of openings in the runners, the drag-bars adjusted lengthwise of the frame, and the rod 25 passed through another pair of openings 11 and through the openings of the drag-bars. Each drag-bar rests firmly in the notch of the cross-rail 8, and it is prevented from being pressed or forced upwardly by the cross-rail 9 and the adjusting-bar 25. The series of drag-bars have their rear beveled ends extended beyond the cross-rail, so as to lie a suitable distance in front of the ring cutters on the revoluble cylinder. Said drag-bars are furthermore arranged in alternate or staggered relation to the ring cutters of the cylinder, and the cutting edges of the drag-bars are thus adapted to crush or cut the clods which may lie in the path of the harrow, while the ring cutters of the cylinder pulverize the ground and the clods in the intervals between the drag-bars. The harrow is thus adapted to thoroughly harrow the ground and break up the clods, and the cutting edges of the bars and rings are especially serviceable in cutting through weeds, vines, and trash.

By slidably fitting the drag-bars in the cross-rails and employing the adjusting-rod to connect the front ends of the drag-bars adjustably to the runners the entire series of drag-bars is firmly supported between the runners of the main frame, and provision is made for adjusting said drag-bars lengthwise of the implement and with relation to the revoluble cylinder. This adjustment of the drag-bars is important because the cutting edges may always be presented at the proper elevation above the ground, and provision is thus made to compensate for wear on the drag-bars.

My harrow is designed to be equipped with a seat to accommodate a driver who may ride on the machine, and to protect the driver from the ring cutters a hood is disposed over the revoluble cylinder. A pair of curved bars 26 are secured firmly to the runners, and these bars support the hood 27, which is secured firmly thereto. A seat-arch 28 is secured to the curved bars 26, and on this arch is fastened the driver's seat 29. If desired, a suitable foot-rest may be provided, on which the driver may place his feet.

30 designates a rake-head which is arranged in a horizontal position in rear of the runners 6 7, and this rake-head is provided with a series of teeth, which may be of any suitable character. The rake-head is connected adjustably with the main frame 5 by means of the links 31, which are secured firmly to the head and are attached pivotally at 32 to the runners. The rake-head is provided with a handle 33, that extends upwardly therefrom and is within convenient reach of the driver. The rake-head may be raised or lowered, as desired, by the driver without leaving his seat, because the handle is readily accessible, and the rake may thus be adjusted to clear itself from accumulations of trash, weeds, &c. The rake is especially serviceable for covering seed in the ground; but it is evident that the rake may be detached by disconnecting the links from the runners.

The implement is designed to be drawn by a team of horses adapted to be hitched in any well-known way to a draft-tongue 34, and this tongue is connected operatively with the runners by a draft-bail 35, having suitable pintles or bolts to fit in two of the openings of the series of openings 11.

I would have it understood that I reserve the right to construct my harrow of any suitable material, and the several elements of the implement may be proportioned as desired by the skilled constructor. It will of course be understood that the elements most exposed to wear will be made of metal; but the framework and some of the other parts of the harrow may be of wood or any other suitable material.

Changes may be made in the form and proportion of some of the parts, while their essential features are retained and the spirit of the invention embodied. Hence I reserve the right to vary the form and proportion of parts.

Having thus fully described the invention, what I claim is—

1. A harrow consisting of a frame, a revoluble cylinder or drum journaled therein, and a series of drag-bars supported in the frame in front of the cylinder, said drag-bars being adjustable longitudinally of the frame, for the purpose described, substantially as set forth.

2. A harrow consisting of a frame, a revoluble drum or cylinder journaled therein, drag-bars supported in the frame and adjustable longitudinally thereof, and an adjusting-rod connected to the drag-bars and the frame, substantially as described.

3. A harrow consisting of a frame provided with spaced, notched bars, a revoluble cylinder journaled in said frame in rear of the bars, the series of drag-bars fitted in the notched bars for slidable adjustment therein, and means for fastening the drag-bars in their adjusted positions, substantially as described.

4. A harrow consisting of side runners, cross-rails secured to the runners one in rear of the other and provided with notches, drag-bars fitted in the notched rails and having the cutting edges at their rear ends, and an adjusting-rod connected to the drag-bars and fastened adjustably to the runners, substantially as described.

5. A harrow consisting of a frame, having the side runners, a series of drag-bars provided with the cutting edges and arranged longitudinally of the frame and inclined with respect to the horizontal positions of the runners, a revoluble cylinder journaled in the frame and provided with a series of annular cutters which are in alternate relation to the cutting edges of the drag-bars, and a rake hung to the frame in rear of the revoluble cylinder, substantially as described.

6. In a harrow, the combination with a frame, of a series of drag-bars provided with cutting edges and supported in inclined positions to present their cutting edges to the ground, and means for adjusting the drag-bars lengthwise of the frame, substantially as described.

7. In a harrow, the combination of a revoluble cylinder provided with annular cutters and adjustable vertically within said frame, inclined drag-bars supported in the frame in advance of the cylinder and in alternate relation to the cutters on said cylinder, and means for adjusting the drag-bars lengthwise of the frame, for the purpose described, substantially as set forth.

In testimony that I claim the foregoing as my own I have hereto affixed my signature in the presence of two witnesses.

ROBERT JAMES CHENOWETH.

Witnesses:
MAY CHENOWETH,
E. G. CHENOWETH.